Dec. 10, 1935.  J. A. CONNOLLY  2,023,724
MEASURING LINE FOR WELL PLUGS
Filed Aug. 6, 1935    2 Sheets-Sheet 2
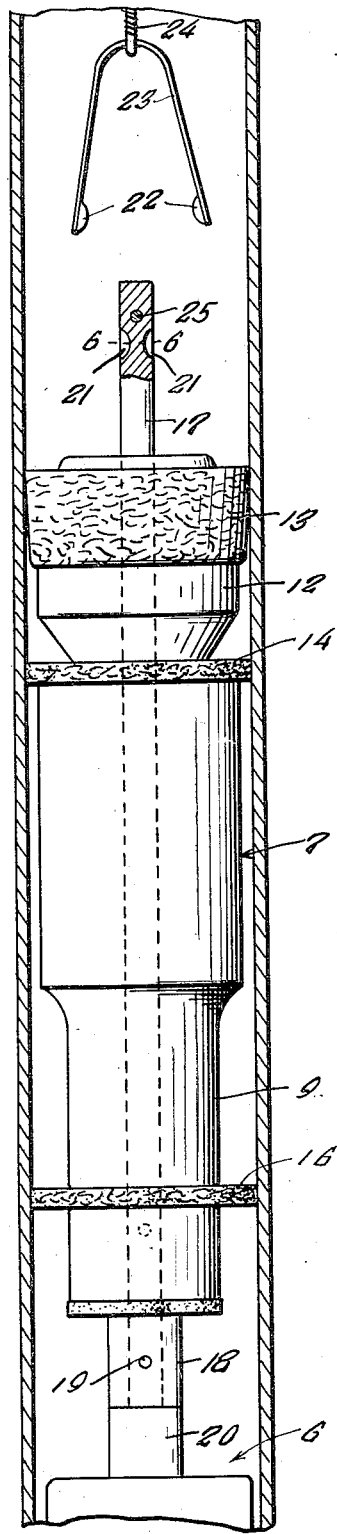
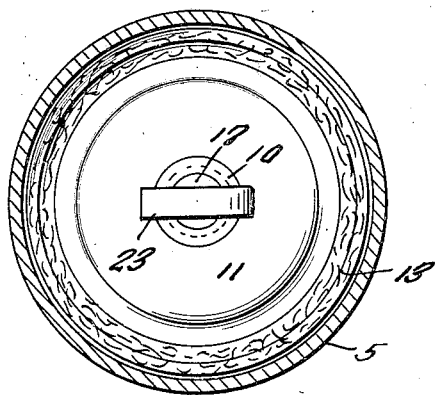
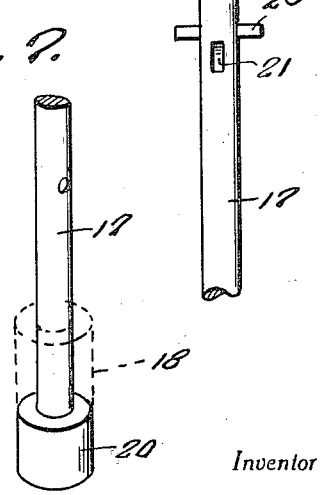
Inventor
John A. Connolly
By Clarence A. O'Brien
Attorney Patented Dec. 10, 1935

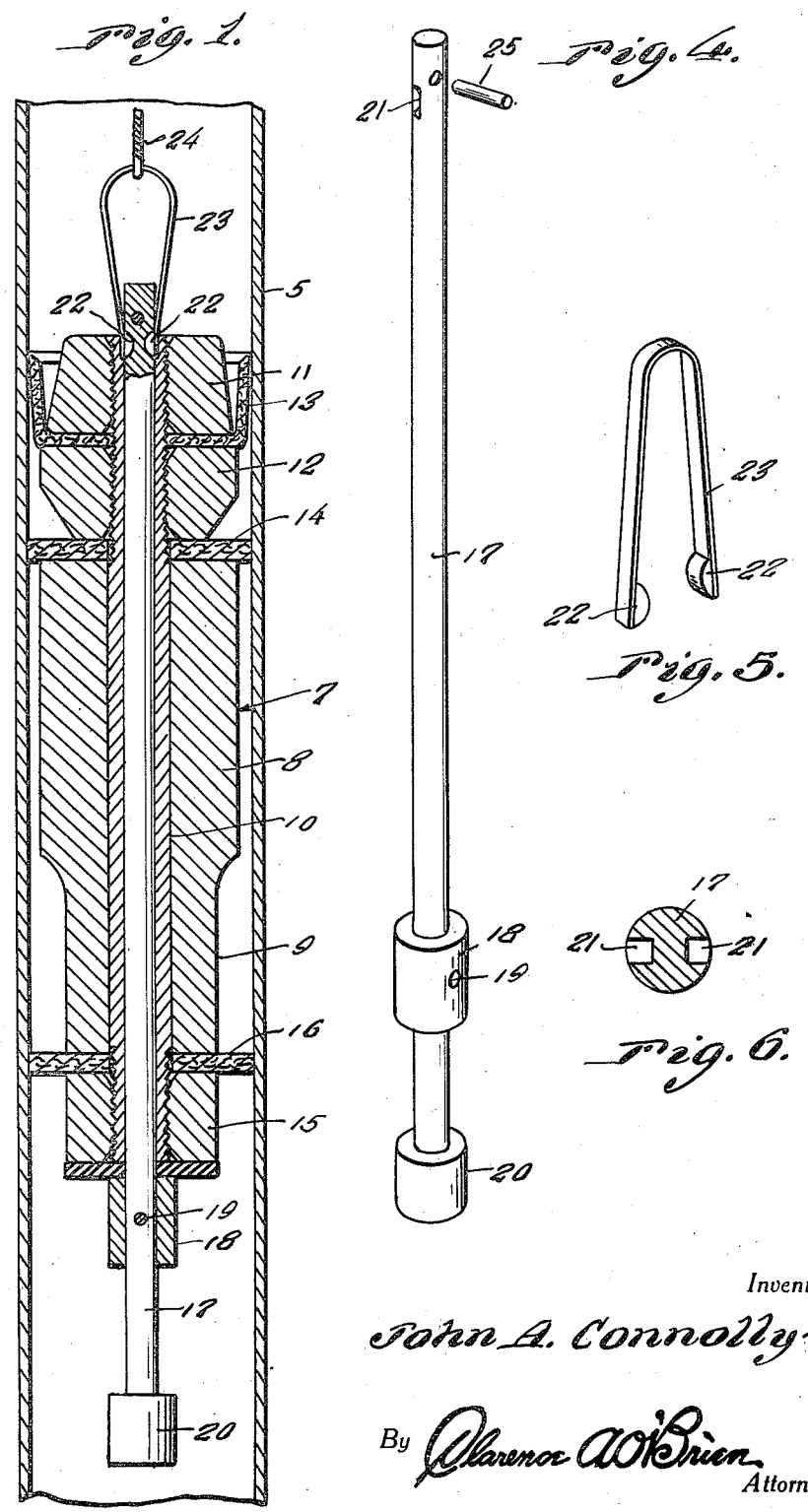

2,023,724

UNITED STATES PATENT OFFICE 2,023,724

MEASURING LINE FOR WELL PLUGS

John A. Connolly, Cut Bank, Mont.

Application August 6, 1935, Serial No. 34,999

3 Claims. (Cl. 166—13)

This invention appertains to new and useful improvements in measuring lines and well plugs and more particularly to a novel construction whereby a measuring line can be easily released from a well cementing plug.

The principal object of the present invention is to provide a measuring line for measuring the distance deep the plug is located having means whereby the measuring line will be automatically released when the plug reaches its destination.

Other important objects and advantages of the invention will become apparent to the reader of the following specification.

In the drawings:

Figure 1 represents a vertical sectional view through the measuring line plug and well casing, with the measuring line connected.

Figure 2 represents a side elevational view of the measuring line attachable plug with the line immediately disconnected and showing the casing in section.

Figure 3 represents a sectional view through the casing.

Figure 4 represents a perspective view of the slide rod.

Figure 5 represents a perspective view of the spring yoke.

Figure 6 represents a sectional view taken substantially on line 6—6 of Figure 2.

Figure 7 represents a fragmentary perspective view of the lower end portion of the push rod.

Figure 8 represents a fragmentary side elevational view of the upper end portion of the push rod.

Referring to the drawings wherein like numerals designate like parts it can be seen that numeral 5 represents the well casing, while numeral 6 generally refers to the primary plug and numeral 7 generally refers to the measuring line plug. The measuring line plug consists of a cylindrical body 8 having the reduced depending portion 9. This body 8 is provided with a longitudinally extending bore for receiving the barrel 10, which barrel 10 is threadedly engaged with internal threads of the barrel at the reduced end portion 9.

Annular and tapered nut members 11 and 12 are threadedly engaged on the upper threaded end portion of the barrel 10 and between these are clamped the cup-shaped packing element 13 in the manner substantially shown in Figure 1, with the nut 12 clamping the packing disk 14 between its top and the upper end of the body 8. A nut 15 on the threaded lower end portion of the barrel 10 clamps the packing disk 16 in place. An elongated slide rod 17 is slidably disposed through the barrel 10 and has a collar 18 thereon through which the shearable pin 19 is disposed, this pin also passing through the rod 17. The lower end of the rod 17 is provided with a head 20, while the upper end of the rod is provided with a pair of recesses 21 at diametrically opposite side portions thereof for receiving the lug members 22—22 on the free ends of the spring yoke 23, the bight portion of which is connected to the measuring line 24. A cross pin 25 is provided in the upper portion of the rod 17 to prevent the rod from extending downwardly through the plug structure too far.

It can now be seen that the plug assembly 7 is lowered into the well with the measuring line attached thereto in the manner shown in Figure 1.

When the head 20 of the rod 17 engages the primary plug 6, the weight of the plug will shear the pin 19 and permit the secondary plug structure 7 to ride downwardly on the rod 17, thus freeing the lug 22 of the spring yoke 23 so that the same can fly upwardly in the manner shown in Figure 2 and the line 24 retract.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. A well cementing plug comprising a plug structure provided with a longitudinal slidable rod therein, a shearable cross pin in the lower portion of the rod for preventing downward movement of the plug on the rod, a measuring line, a connection between the measuring line and the upper end portion of the rod, said shearable pin being adapted to be sheared when force of the plug is exerted thereon to free the connector of the measuring line from the rod.

2. A well cementing plug comprising a plug structure provided with a longitudinal slidable rod therein, a shearable cross pin in the lower portion of the rod for preventing downward movement of the plug on the rod, a measuring line, a connection between the measuring line and the upper end portion of the rod, said shearable pin being adapted to be sheared when force of the plug is exerted thereon to free the connector of the measuring line from the rod, said plug being provided with an elongated barrel extending through the bore thereof, one end of the barrel being threaded, nut members on the threaded end portion of the barrel, a cup-shaped packing element adapted to be clamped between the nut members, and a second packing element adapted to be clamped between one end of the plug and one of the nuts.

3. A well cementing plug comprising a plug structure provided with a longitudinal slidable rod therein, a shearable cross pin in the lower portion of the rod for preventing downward movement of the plug on the rod, a measuring line, a connection between the measuring line and the upper end portion of the rod, said shearable pin being adapted to be sheared when force of the plug is exerted thereon to free the connector of the measuring line from the rod, said connector being in the form of a spring yoke.

JOHN A. CONNOLLY.